(12) United States Patent
Ise

(10) Patent No.: US 12,348,889 B2
(45) Date of Patent: Jul. 1, 2025

(54) IMAGE PROCESSING APPARATUS, METHOD OF CONTROLLING IMAGE PROCESSING APPARATUS, AND PROGRAM STORAGE

(71) Applicant: CANON KABUSHIKI KAISHA, Tokyo (JP)

(72) Inventor: Yasuaki Ise, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 116 days.

(21) Appl. No.: 18/295,913

(22) Filed: Apr. 5, 2023

(65) Prior Publication Data

US 2023/0336682 A1 Oct. 19, 2023

(30) Foreign Application Priority Data

Apr. 14, 2022 (JP) ................. 2022-067199

(51) Int. Cl.
| | |
|---|---|
| *H04N 5/265* | (2006.01) |
| *G06T 7/20* | (2017.01) |
| *H04N 23/71* | (2023.01) |
| *H04N 23/76* | (2023.01) |
| *H04N 23/81* | (2023.01) |
| *H04N 23/84* | (2023.01) |
| *H04N 25/47* | (2023.01) |

(52) U.S. Cl.
CPC ............. *H04N 5/265* (2013.01); *G06T 7/20* (2013.01); *H04N 23/71* (2023.01); *H04N 23/76* (2023.01); *H04N 23/81* (2023.01); *H04N 23/84* (2023.01); *G06T 2207/10024* (2013.01); *H04N 25/47* (2023.01)

(58) Field of Classification Search
CPC ........ H04N 5/265; H04N 23/71; H04N 23/76; H04N 23/81; H04N 23/84; H04N 25/47; H04N 23/90; H04N 5/275; H04N 23/60; G06T 7/20; G06T 2207/10024; G06T 5/50; G06T 5/77

See application file for complete search history.

(56) References Cited

U.S. PATENT DOCUMENTS

| 10,096,091 B2 | 10/2018 | Lee et al. | |
|---|---|---|---|
| 2004/0179110 A1* | 9/2004 | Hashimoto | G08B 13/19667 348/222.1 |
| 2017/0195556 A1* | 7/2017 | Emi | H04N 23/64 |
| 2021/0385404 A1* | 12/2021 | Niwa | H04N 23/20 |
| 2022/0232182 A1* | 7/2022 | Watanabe | H04N 23/741 |

FOREIGN PATENT DOCUMENTS

JP 2017-091518 A 5/2017

* cited by examiner

*Primary Examiner* — Mekonnen D Dagnew
(74) *Attorney, Agent, or Firm* — Cowan, Liebowitz & Latman, P.C.

(57) ABSTRACT

An image processing apparatus configured to generate image data that makes it possible to improve visibility is on the basis of image data acquired by a first image capturing unit and a second image capturing unit includes the first image capturing unit configured to acquire first image data which is image data of a frame format, the second image capturing unit configured to acquire second image data which is data based on event data of a change in luminance of a subject for each pixel, and a processing unit configured to generate third image data by performing predetermined processing on the first image data on the basis of the second image data.

19 Claims, 11 Drawing Sheets

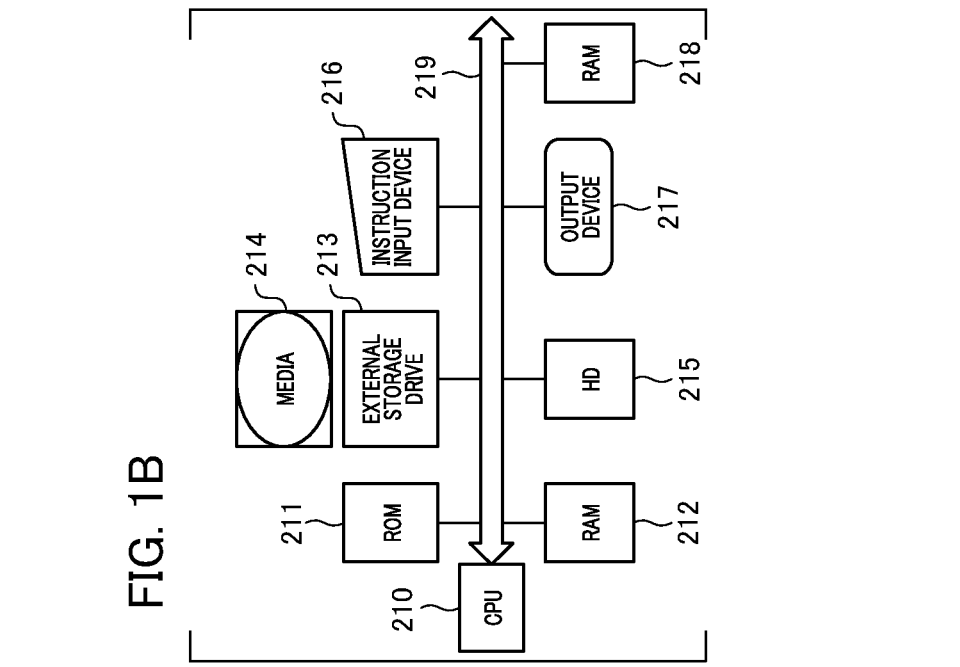
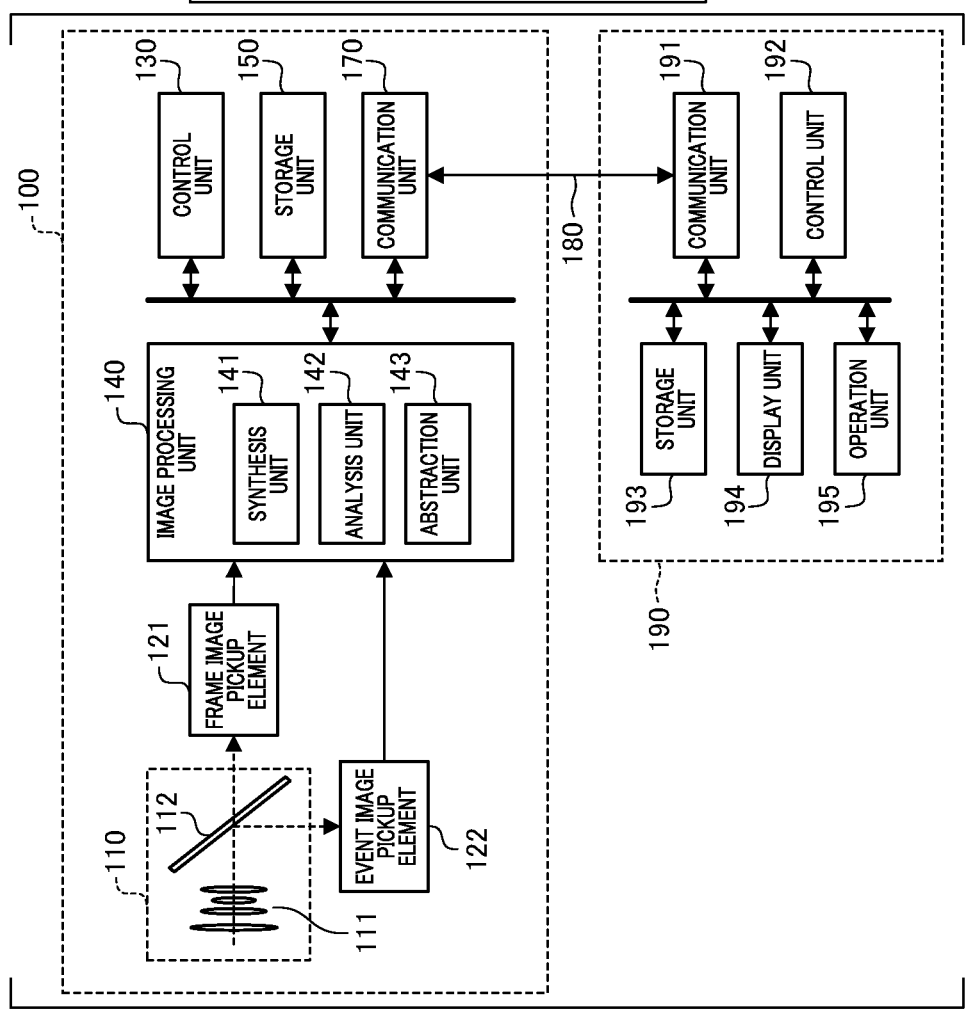

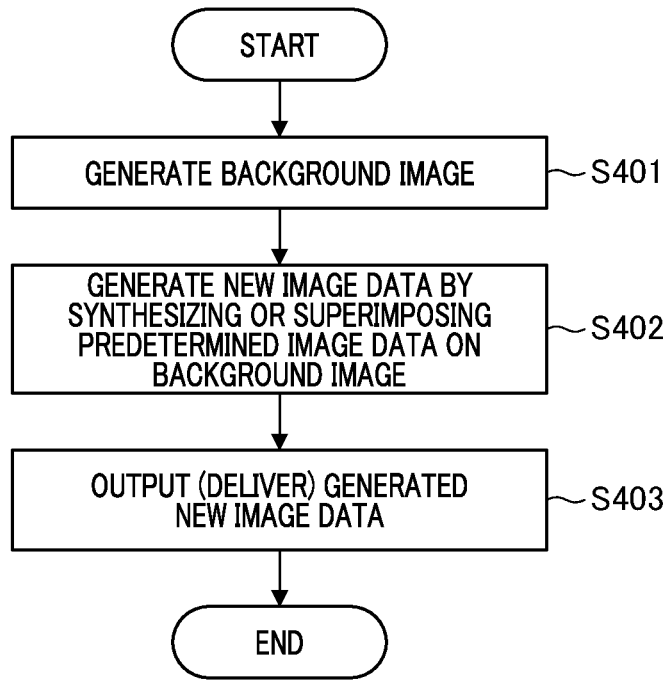

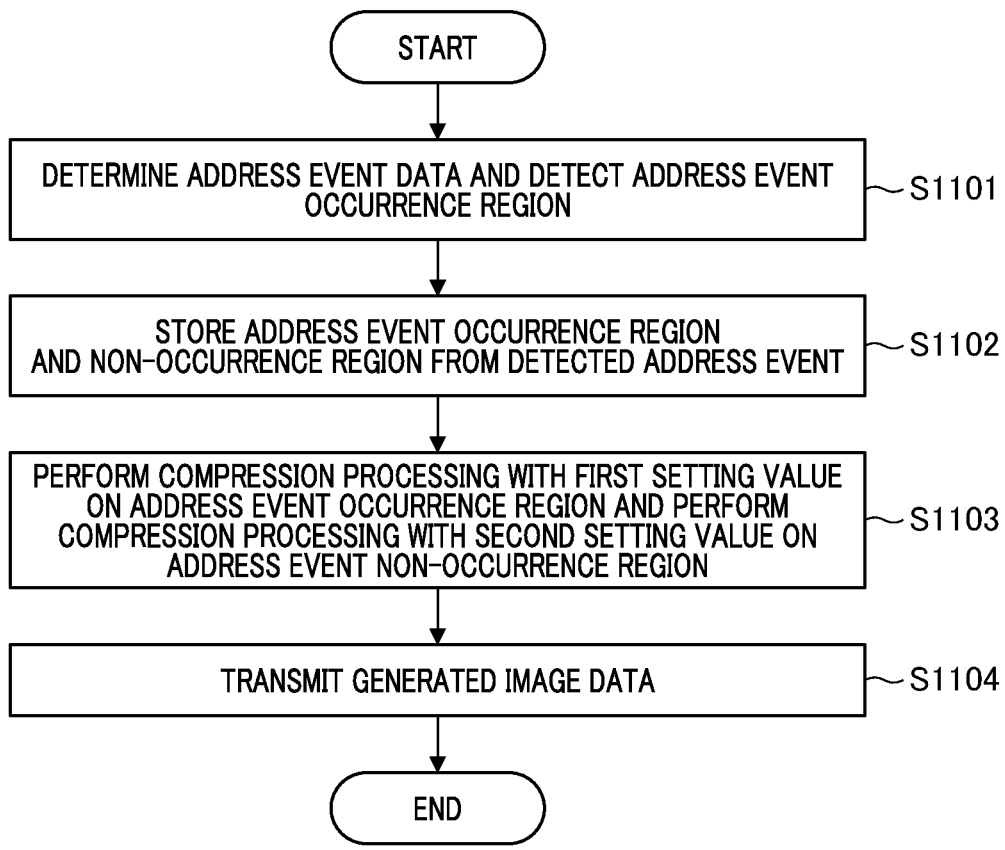

IMAGE PROCESSING APPARATUS, METHOD OF CONTROLLING IMAGE PROCESSING APPARATUS, AND PROGRAM STORAGE

BACKGROUND OF THE INVENTION

Field of the Invention

The present invention relates to an asynchronous type image capturing apparatus.

Description of the Related Art

Since the past, synchronous type (frame type) photoelectric conversion apparatuses (including solid-state image pickup elements) that capture image data (frames) in synchronization with a synchronizing signal such as a vertical synchronizing signal have been used in image capturing apparatuses and the like. Since general synchronous type photoelectric conversion apparatuses can acquire image data only for each period (for example, 1/60 seconds) of a synchronizing signal, it is difficult to cope with a case where faster processing is required in fields related to transportation, robots, and the like.

Consequently, Japanese Patent Laid-Open No. 2017-91518 proposes an asynchronous type photoelectric conversion apparatus in which each pixel is provided with a detection circuit that detects in real time that the amount of light received exceeds a threshold as an address event. An asynchronous type (event type) photoelectric conversion apparatus that detects an address event for each pixel is also referred to as a dynamic vision sensor (DVS).

SUMMARY OF THE INVENTION

However, on the other hand, since an event type photoelectric conversion apparatus outputs data only from pixels that detect an event, the amount of information is small, and thus it is not suitable for confirming a subject from a bird's-eye view including the surrounding environment or visual confirmation by a person.

An object of the present invention is to provide an image processing apparatus that generates image data that makes it possible to improve visibility on the basis of image data acquired by a first image capturing unit and a second image capturing unit.

An image processing apparatus according to an aspect of the present invention includes at least one processor or circuit configured to function as: the first image capturing unit configured to acquire first image data which is image data of a frame format; the second image capturing unit configured to acquire second image data which is data based on event data of a change in luminance of a subject for each pixel; and a processing unit configured to generate third image data by performing predetermined processing on the first image data on the basis of the second image data.

Further features of the present invention will become apparent from the following description of exemplary embodiments with reference to the attached drawings.

BRIEF DESCRIPTION OF THE DRAWINGS

FIGS. 1A and 1B are block diagrams illustrating a configuration of an image capturing apparatus and a display device according to Example 1.

FIG. 4 is a flowchart illustrating processing according to Example 1.

FIG. 11 is a flowchart illustrating processing according to Example 3.

DESCRIPTION OF THE EMBODIMENTS

Figure 2:
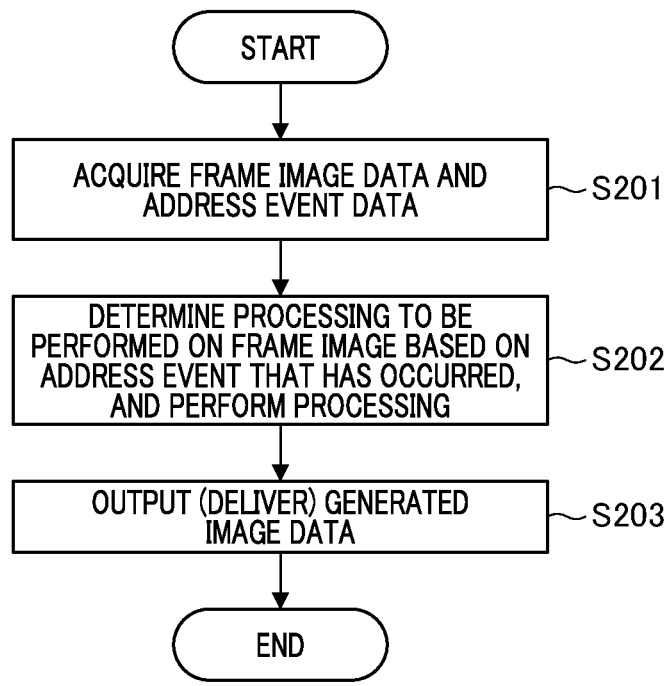
FIG. 2 is a flowchart illustrating an outline of a flow of processing according to Example 1.

Hereinafter, embodiments for carrying out the present invention will be described in detail with reference to the accompanying drawings. The embodiments to be described below are examples of means for realizing the present invention and should be appropriately modified or changed according to the configuration of an apparatus to which the present invention is applied or various conditions, and the present invention is not limited to the following embodiments. In addition, some of the embodiments to be described later may be appropriately combined and configured.

First Embodiment

An image processing apparatus according to Example 1 will be described with reference to FIG. 1. FIG. 1 is a block diagram illustrating a configuration of an image capturing system (image processing system) including an image capturing apparatus 100 and a display device 190 of Example 1. FIG. 1A is a schematic diagram illustrating a functional configuration of the image capturing apparatus 100 which is an image processing apparatus in the image capturing system together with the display device 190. FIG. 1B is a block diagram illustrating an example of a hardware configuration for realizing the functions of a control unit 130, an image processing unit 140, a control unit 192, and the like which are included in the image capturing apparatus 100 and the display device 190.

The image capturing apparatus 100 which is an image processing apparatus according to Example 1 can perform predetermined processing on address event data and a frame image (frame image data) using the control unit 130 and the image processing unit 140 which will be described later. The processing to be performed is, for example, noise reduction processing of image data, compression processing of moving image data or still image data (image data), and image data synthesis processing. The synthesis processing is, for example, a process of generating a synthesized image (synthesized image data) of address event data and a frame image.

In addition, the image capturing apparatus 100 which is an image processing apparatus according to Example 1 can extract attribute information to be described later from the address event data. Further, the extracted attribute information, a frame image generated by an image pickup element (first image capturing unit) 121, address event data generated by an image pickup element (second image capturing unit) 122, or a synthesized image can be output. In addition, the image capturing apparatus 100 which is image processing apparatus according to Example 1 may be constituted by, for example, a plurality of information processing apparatuses connected through a network.

The image capturing apparatus 100 includes an optical unit 110, the image pickup element (frame image pickup element) 121, the image pickup element (event image pickup element) 122, the control unit 130, the image processing unit 140, a storage unit 150, and a communication unit 170.

The optical unit 110 guides light from an image capturing region to the image pickup element 121 and the image pickup element 122. In addition, the optical unit 110 includes an optical mechanism 111 and an optical mechanism 112. The optical mechanism 111 includes, for example, control mechanisms for zooming, focusing, a diaphragm, hand-shake correction, and the like, a lens group, and other components. The optical mechanism 112 separates light incident on the image pickup element 121 from light incident on the image pickup element 122. The optical mechanism 112 is a mirror and may be composed of, for example, a half mirror or the like. In addition, the optical mechanism 112 may not be a coaxial optical system and may be composed of two different optical mechanisms, for example, an optical mechanism to which the image pickup element 121 is connected and an optical mechanism to which the image pickup element 122 is connected.

The image pickup element 121 is an image pickup element that captures (acquires) a frame image of an image capturing region which is an image capturing target. The image pickup element 121 can, for example, receive visible light and generate an image signal of a visible light image. The image pickup element 122 is an image pickup element that acquires an address event of an image capturing region. In addition, the image pickup element 122 can, for example, receive visible light, determine the occurrence of an address event by comparing the amount of light received, and output it as address event data (event data).

The frame image which is output from the image pickup element 121 and the address event data which is output from the image pickup element 122 are input to the image processing unit 140 as image signals which are electrical signals. Each of the image pickup elements 121 and 122 is connected to the control unit 130 and the image processing unit 140.

The image pickup element 121 and the image pickup element 122 may be image pickup elements capable of capturing an image of non-visible light. In addition, the image pickup element 121 and the image pickup element 122 may be, for example, CMOS sensors, in which case a subject image formed on the image capturing surface can be converted into an electrical signal and output. In addition, the image pickup element 121 or the image pickup element 122 may be composed of a photoelectric conversion apparatus (solid-state image pickup element) that digitally counts the number of photons arriving at an avalanche photodiode (hereinafter referred to as an APD) and outputs the counted value as a photoelectrically converted digital signal from a pixel. The photoelectric conversion apparatus is, for example, a photon count type sensor. That is, it may be configure to be able to detect a change in luminance of a subject for each pixel. The photon count type sensor can determine the occurrence of an address event by comparing (comparing at predetermined times intervals) the number of photons per unit time, and is suitable for faster subjects as compared with conventional CMOS sensors. In addition, since a comparison from one photon can be made, it is possible to detect a subject and determine an address event even in an extremely dark environment.

Here, the image capturing apparatus 100 in Example 1 is preferably configured to so that the imaging angles of view of a subject image which is incident on the image pickup element 121 and the image pickup element 122 through the optical mechanism 112 are substantially the same as each other. If the imaging angles of view of the image pickup element 121 and the image pickup element 122 are equal to each other, it becomes easy to associate a subject image projected onto the pixels of the image pickup element 121 with the pixels of the image pickup element 122 onto which the same subject image is projected. Meanwhile, if the sizes and imaging angles of view of the image pickup element 121 and the image pickup element 122 are different from each other, the same effect can be obtained even if the imaging angles of view are associated with each other by cutting out or resizing an image region.

In this way, in the image pickup element of Example 1, both the frame image and the address event data can be acquired using the optical unit 110 and the two image pickup elements 121 and 122. Meanwhile, although the image capturing apparatus 100 has the two different image pickup elements 121 and 122 as described above, it may be composed of a single photoelectric conversion apparatus capable of acquiring the frame image and the address event data. Here, if a single photoelectric conversion apparatus is used, the optical mechanism 112 is not required.

The control unit 130 includes a CPU 210 and the like to be described later, is composed of at least one computer, and controls the overall operation of the image capturing apparatus 100. In addition, the control unit 130 can compress image data to generate compressed image data, for example, can compress a frame image or a synthesized image to be described later in Example 1. In addition, the control unit 130 can perform still image compression or moving image compression. Examples of image compression methods include standards such as H.264, H.265, MPEG, or JPEG. In addition, the control unit 130 may generate image data of any format including mp4 or avi format or the like as the format of image data.

In addition, the control unit 130 can output image data or the above-described compressed image data. That is, the control unit 130 can output a frame image, address event data, a synthesized image, or a compressed image thereof. For example, the control unit 130 can output image data to store (hold or save) the image data in an internal or external storage of the image capturing apparatus 100. As a specific example, the control unit 130 can record image data or compressed image data in the storage unit 150 of the image capturing apparatus 100, a recording medium (not shown), or the like. In addition, the control unit 130 is configured to be able to transmit the image data and the compressed image data to the outside of the image capturing apparatus 100 through the communication unit 170 and a network 180. In Example 1, the control unit 130 can output the image data and the compressed image data to the display device 190 by transmitting them to the display device 190 which is an information processing apparatus.

The image processing unit 140 can perform image processing on the frame image acquired by the image pickup element 121 and the address event data acquired by the image pickup element 122. For example, the image processing unit 140 generates a frame image by performing image processing such as pixel interpolation processing or color conversion processing on image signals obtained from the image pickup element 121 and the image pickup element 122. In addition, the image processing unit 140 may perform correction processing such as pixel defect correction or lens correction, or detection processing for adjusting black level, focus, exposure, or the like. Further, the image processing unit 140 may perform demosaic processing, white balance processing, gamma correction processing, edge enhancement processing, noise suppression processing, or the like. The image processing unit 140 stores the image data after such image processing in a storage such as the storage unit 150.

The image processing unit 140 according to Example 1 includes a synthesis unit 141, an analysis unit 142, and an abstraction unit 143. The synthesis unit 141 generates, for example, an event frame image obtained by converting address event data generated in a predetermined period into a frame image. In addition, the synthesis unit 141 may synthesize the frame image and the address event data to generate a synthesized image. That is, the image processing unit 140 can generate a synthesized image of one frame using the frame image captured by the image pickup element 121 and the image pickup element 122 and the address event data.

The analysis unit 142 detects, for example, a pixel group indicating the same subject from the address event that has occurred. In addition, the analysis unit 142 calculates the amount of movement of the subject from a change in pixel values in adjacent pixel groups. In addition, it is possible to extract the contour of the subject, detect a pixel group which is the same subject, and calculate the movement speed of the extracted subject region or the like. Further, the analysis unit 142 may be configured to be able to identify the subject from the detected pixel group and classify the category of subject. Further, the analysis unit 142 may be configured to be able to identify what the subject is from information on the contour or shape of the pixel group constituting the same subject. These can be realized by the related art such as machine learning or pattern recognition.

In addition, the analysis unit 142 may be configured to be able to generate attribute information by analyzing the address event. For example, if it is possible to determine a category such as a person or a vehicle from information on the shape of the subject, binary information that makes it possible to identify a person or a vehicle is generated as attribute information of the subject. Such category information is stored in the storage unit 150 as the attribute information. Additionally, a movement method of the subject, information on the position of the subject, the calculated speed of the subject, and information indicating the movement direction of the subject may also be the attribute information, and these may also be stored in the storage unit 150. The attribute information stored in the storage unit 150 is preferably stored in association with the corresponding address event data and the generated synthesized image.

The abstraction unit 143 converts the address event data into abstract image data (hereinafter referred to as abstracted image data) on the basis of the feature amount or attribute information extracted by the analysis unit 142. That is, the abstraction unit 143 can generate the abstracted image data from the address event data. The abstracted image data may be, for example, an arrow or a silhouette image with contours connected. In addition, for example, the abstracted image data may be replaced with image data stored in advance in the storage unit 150. In addition, the abstraction unit 143 may be configured to replace the feature amount detected by the analysis unit 142 with image data associated as a table and stored in the storage unit 150.

The storage unit 150 can store programs or various types of data. The storage unit 150 may have a non-volatile memory and a RAM. The non-volatile memory can store a control program for defining a procedure of processing performed by the control unit 130 or various parameters used by the control unit 130 for processing. The RAM can be used as a work area for the control unit 130, and can also be used as a storage region for the image processing unit 140 to perform image processing.

The communication unit 170 is a network processing circuit. The communication unit 170 can, for example, convert (compressed) image data or event data packetized into a predetermined amount of data into a communication signal compliant with a communication protocol, and transmit the converted signal to the network 180.

The display device (client device) 190 is communicably connected to the image capturing apparatus 100 through the network 180. The display device 190 is, for example, an information processing apparatus such as a personal computer. The display device 190 includes a communication unit 191, the control unit 192, a storage unit 193, a display unit 194, an operation unit 195, and the like.

The communication unit 191 is a network processing circuit and can communicate with the image capturing apparatus 100 through the network 180. The control unit 192 can receive each piece of image data from the image capturing apparatus 100 through the communication unit 191 and decompress the received image data as necessary. Each piece of image data is data generated by the control unit 130 or the image processing unit 140 of the image capturing apparatus 100, such as, for example, a frame image, address event data, a synthesized image, compressed image data, an event frame image, abstracted image data, or the like. In addition, the control unit 192 can control the operation of the image capturing apparatus 100 by transmitting control information (a control signal) for controlling the image capturing apparatus 100 to the image capturing apparatus 100 through the communication unit 191. The storage unit 193 can store each piece of image data received through the communication unit 191.

The display unit 194 can receive each piece of image data transmitted from the image capturing apparatus 100 through the communication unit 191. In addition, the display unit 194 can display a user interface (UI), image information composed of each piece of image data received from the image capturing apparatus 100, or the like on the screen to a user who operates the display device 190. The operation unit 195 is constituted by a mouse, a keyboard, or the like, and receives an operation input from the user. Meanwhile, the user can perform an input or the like for controlling the image capturing apparatus 100 or the display device 190 by the user's operation of the user interface (UI) such as icons displayed on the display unit 194.

Each unit included in the image capturing apparatus 100 and the display device 190 may be constituted by dedicated hardware, or may be realized by software. Meanwhile, the control unit 130, the image processing unit 140, and the control unit 192 to be described below are realized by software. For example, the functions of the control unit 130, the image processing unit 140, and the control unit 192 are realized by a processor such as the CPU 210 shown below executing a program stored in a storage such as the storage unit 150.

Reference is not made to FIG. 1B to describe an example of a hardware configuration for realizing the functions of the control unit 130, the image processing unit 140, and the control unit 192, and the like included in the image capturing apparatus 100 and the display device 190.

The CPU 210 controls various processes by executing an operating system (OS), a control program, a processing program, or the like stored in a hard disk device (HD) 215. In addition, the CPU 210 can control transmission and reception of data to and from an external device through an interface (I/F) 218.

A ROM 211 stores various types of data such as basic I/O programs and application programs for executing predetermined processing. ARAM 212 temporarily stores various types of data and can function as a main memory, a work area, or the like for the CPU 210. A drive 213 can access media 214 and load, for example, programs and the like stored in the media into the system shown in FIG. 1B. The media (recording media) 214 are recording media that store control programs and the like. The HD 215 is a large-capacity memory, for example, a hard disk. The HD 215 can store application programs, an OS, control programs, or related programs, and the like.

Meanwhile, in FIG. 1B, the HD 215 which is a hard disk is used as a memory, but a non-volatile storage device such as a flash memory may be used. The ROM 211, the RAM 212, the HD 215, and the like shown in FIG. 1B can function as the storage unit 150 shown in FIG. 1A.

An input device 216 acquires a user's input to the image capturing apparatus 100 or the display device 190. The input device 216 may be, for example, a keyboard, a pointing device (such as a mouse), a touch panel, or the like, and can function as the operation unit 195 shown in FIG. 1A (corresponding to an operation unit 105). An output device 217 can output a command input from the input device 216 and a response or the like from the image capturing apparatus 100 or the display device 190 with respect to this command. The output device 217 may be, for example, a display, a speaker, a headphone terminal, or the like, and can function as the display unit 194 shown in FIG. 1A (corresponding to the display unit 194).

The interface (I/F) 218 mediates exchange of data between the image capturing apparatus 100 or the display device 190 and an external device. For example, the I/F 218 may include a wireless communication module. The wireless communication module can include well-known circuits including an antenna system, an RF transmitter/receiver, one or more amplifiers, a synchronizer, one or more oscillators, a digital signal processor, a CODEC chipset, a subscriber identification module card, a memory, or the like.

In addition, the I/F 218 can include a wired communication module for wired connection. This wired communication module can enable communication between the image capturing apparatus 100 or the display device 190 and other devices through one or more external ports. This external port is connected to other devices either directly or indirectly through a network in accordance with standards such as Ethernet (registered trademark), USB, or IEEE1394. Further, the I/F 218 can include various software components that process data. Meanwhile, the I/F 218 can also be realized using software for realizing functions equivalent to those described above. The I/F 218 can function as the communication unit 170 or the communication unit 191 shown in FIG. 1A. A system bus 219 takes charge of a flow of data within the system shown in FIG. 1B.

(Flow of Overall Processing)

Hereinafter, a flow of processing performed by the image capturing apparatus 100 in Example 1 will be described with reference to FIG. 2. FIG. 2 is a flowchart illustrating an outline of a flow of processing performed by the image capturing apparatus 100 of Example 1. Meanwhile, each operation (process) shown in the flowchart of FIG. 2 is controlled by the CPU 210 executing a computer program. In addition, each step is marked with S at the head to omit the notation of step.

First, in S201, the control unit 130 drives the image pickup element 121 and the image pickup element 122, and acquires the frame image captured by the image pickup element 121 and the address event data captured by the image pickup element 122.

Next, in S202, the control unit 130 determines processing to be performed on the frame image on the basis of the address event that has occurred. Thereafter, the determined processing is executed to generate new image data. Meanwhile, the processing determined by the control unit 130 in S202 includes, for example, noise reduction processing, compression processing of a captured image, synthesis processing of address event data and a frame image, and the like. In Example 1, the processing determined by the control unit 130 will be described below as performing synthesis processing. Meanwhile, in Example 2 to be described later, the processing determined by the control unit 130 will be described as performing noise reduction processing. Further, in Example 3, the processing determined by the control unit 130 will be described as performing compression processing of a captured image. The processing may be able to be arbitrarily selected by the user through the operation unit 195 of the display device 190. In addition, the processing to be performed may be able to be determined by the control unit 130 determining an address event that occurs.

Next, in S203, the control unit 130 outputs (transmits or delivers) the newly generated image data to the display device 190 through the communication unit 170. Thereby, the newly generated image data is displayed on the display unit 194 of the display device 190.

Meanwhile, although the image data generated by the image capturing apparatus 100 is a frame image in Example 1, it is not limited to this, and may be image data obtained by converting still image data or moving image data into a predetermined format. In addition, it may be configured to output a combination of a frame image based on the frame image captured by the image pickup element 121 and the address event data captured by the image pickup element 122. In addition, the address event data to be output may be transmitted as an address event data group in which the address event data output by the image pickup element 122 is packetized. Further, it may be configured to output a frame image of address event data generated within a predetermined period.

(Relationship Between Frame Image and Address Event)

FIG. 3 is a schematic diagram illustrating a relationship between the frame image of the image pickup element 121 and the address event data of the image pickup element 122.

If the image capturing apparatus 100 outputs the address event data, it is necessary to change the response in accordance with the form of output. For example, the data may be output as the address event data, output as a frame, output after synthesis with a frame image, and the like.

If the address event data acquired from the image pickup element 122 is output, as it is, from the image capturing apparatus 100, the generated address event data is sequentially output. In addition, the address event data may be temporarily stored in the storage unit 150 and transmitted together as a data group of a predetermined amount. Since the address event data is generated only in pixels having a change in the subject, the address event data is characterized in that the amount of data is smaller than that of the frame image. In addition, since it is limited to a subject which is a moving object, it is possible to output more data at a higher speed than the frame image when viewed as a moving object image.

On the other hand, if the address event data acquired from the image pickup element 122 is transmitted as a framed event frame image, it is necessary to store a predetermined amount of address event data in the storage unit 150. In addition, if it is synthesized with the frame image acquired from the image pickup element 121, the image data need to be caused to correspond to the capturing period of the frame image. The relationship therebetween is shown in FIG. 3.

Figure 3B:
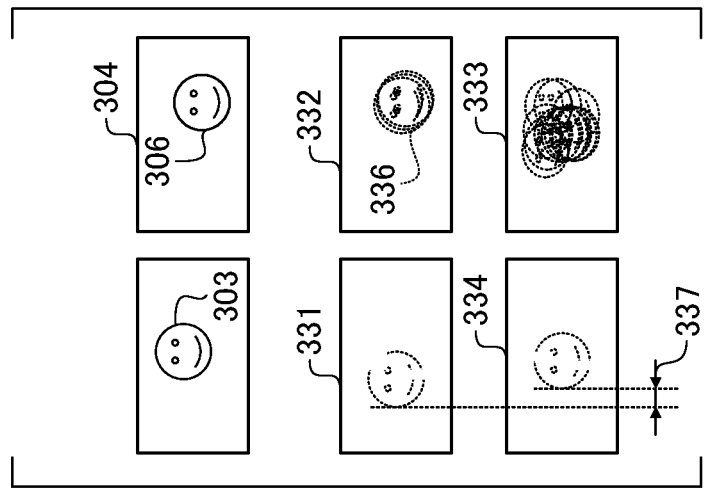
FIGS. 3A and 3B are schematic diagrams illustrating an operation of an image pickup element according to Example 1.
Figure 3A:
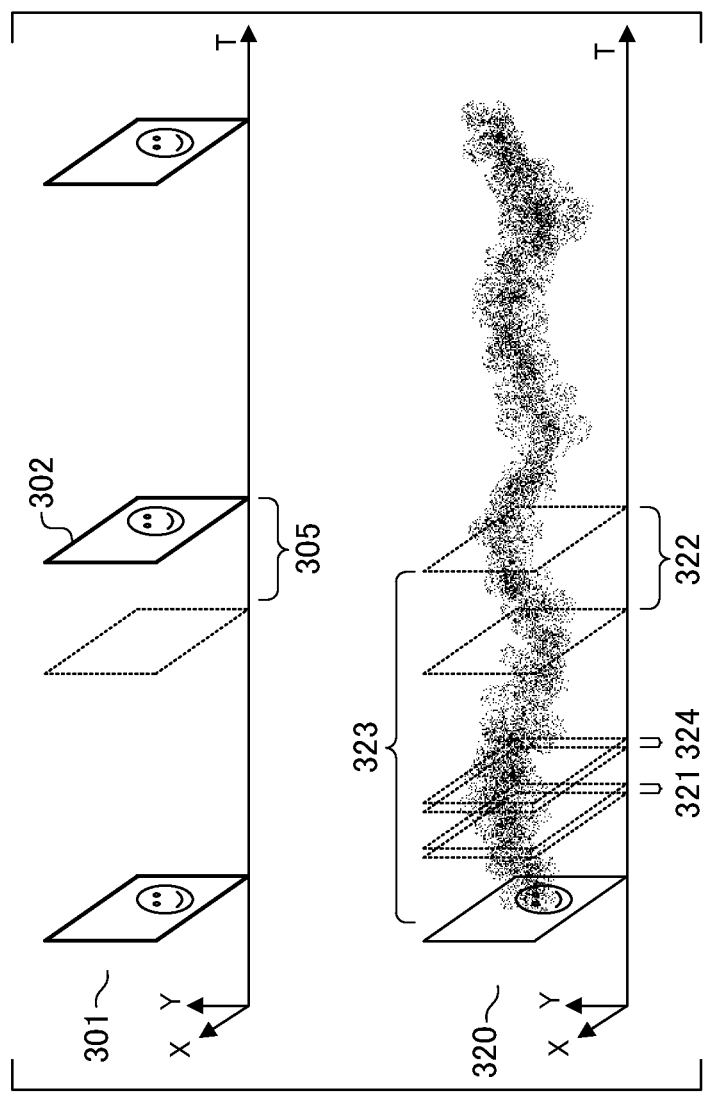

FIG. 3A is a diagram illustrating a frame image of the image pickup element 121 and address event data of the image pickup element 122 as output data arranged on the x and y planes and the time axis T. Here, an image output (output data) 301 is a frame image of the image pickup element 121, and an image output (output data) 302 is address event data of the image pickup element 122.

FIG. 3B shows image data obtained by plotting the output data at each timing shown in FIG. 3A on a two-dimensional plane for convenience. Each image output is an image output obtained by capturing an image of the operation of the same subject, and shows a state in which a subject 303 moves within the angle of view at a constant period.

The image output 301 indicates the frame image output of the image pickup element 121, and indicates, for example, each frame image driven at 60 fps. A captured image 304 indicates a frame image output at a timing of the image output 302. The image pickup element 121 has pixels that perform photoelectric conversion of incident light to generate an electrical signal. In addition, it is also a photoelectric conversion apparatus that performs image capturing in synchronization with a vertical synchronizing signal and outputs a frame image which is image data of a frame format. The captured image 304 is a frame image captured by the image pickup element 121. A period 305 indicates an exposure period which is set when the captured image 304 is acquired. For example, if the image pickup element 121 is a global shutter type photoelectric conversion apparatus, all the pixels have pixel values accumulated by incident light of the same period 305. Since the output data of each pixel is synchronized, it can be said to be a synchronous type photoelectric conversion apparatus.

An image output 320 indicates address event data which is output by the image pickup element 122. The image pickup element 122 performs, for example, an image capturing operation of performing photoelectric conversion on incident light in a pixel to generate an electrical signal similarly to a synchronous type image sensor. Here, the image pickup element 122 does not generate a frame image of a frame format, but generates event data indicating the occurrence of an event which is a change in the electrical signal of a pixel.

This event data is output as address event data (a detection value) if it is detected that the luminance value (signal value) of a pixel has changed by a predetermined amount or more. In addition, pixels for which no address event occurs do not output address event data. That is, since the occurrence of address events is caused by a change in luminance of a subject, the frequency of occurrence differs for each pixel. Since data is output each time an address event occurs, the data output is asynchronous. Output data SOUT is represented, for example, as SOUT=(x, y, E, t), and is output as a combination of x, y coordinate information, an event detection value E, and time information t. The event detection value E includes the polarity (positive or negative) of a change in luminance per unit time, and is represented by, for example "+1" and "−1."

An image 331 shown in FIG. 3B is image data obtained by plotting the address event data for a period 321 shown in FIG. 3A on a two-dimensional plane. An image 334 is image data obtained by plotting the address event data for a period 324 shown in FIG. 3A on a two-dimensional plane. Meanwhile, the event frame image generated from the address event data by the image processing unit 140 also becomes the same image data as described above. A period 322 is an output period of an address event equivalent to the period 305 of the frame image.

An image 332 is an event frame image for the period 322. Since the address event data 336 is generated in the image 332, it can be detected that a subject 306 in the captured image 304 is a moving subject. Meanwhile, if the number of address events that occur per unit time is small, the number of pixels is reduced as in the image 331. Therefore, if the number of pixels is extremely small, it becomes difficult to identify the subject from the address event data.

An image 333 is an event frame image corresponding to a period 323. As shown in FIG. 3A, the period 323 is a longer period than the period 322. Here, although it is possible to increase the number of pixels on the event frame image by lengthening the period of framing as in the period 323, there may be cases where it is difficult to identify the subject as in the image 333 as the acquire image.

The control unit 130 stores the received address event in the storage unit 150. In addition, the control unit 130 appropriately set the detection period of the address event to be framed by the image processing unit 140 in accordance with the brightness of the environment and the image capturing conditions. This makes it possible for the synthesis unit 141 to generate an event frame image that can be analyzed by the analysis unit 142. Further, the control unit 130 can calculate the movement direction and speed of the subject by detecting the movement direction and the amount of displacement 337 of an address event data group to be generated per unit time.

(Flow of Background Image+Event)

Next, as processing in Example 1 which is performed by the image capturing apparatus 100, a method of performing synthesis processing on image data will be described below with reference to FIG. 4. FIG. 4 is a flowchart of image data synthesis processing and display processing on the display device 190. Specifically, a background image (background image data) is generated from the acquired frame image and address event data. A process of synthesizing or superimposing predetermined image data on the generated background image is performed to generate a new image and cause the display device 190 to display the new image. Meanwhile, each operation (process) shown in the flowchart of FIG. 4 is controlled by the CPU 210 executing a computer program. In addition, each step is marked with S at the head to omit the notation of step.

First, in S401, the image processing unit 140 generates a background image (third image data) on the basis of the frame image (first image data) captured (acquired) by the image pickup element 121 and the address event data (second image data) captured (acquired) by the image pickup element 122. The background image is generated by removing the moving object image within the imaging angle of view. Here, the control unit 130 and the image processing unit 140 detects (specifies) the position of generation of the moving object image from the region of occurrence of the address event in a certain reference frame image. The image processing unit 140 generates a background image by interpolating the region of occurrence of the moving object image from another frame image in which no address event occurs. Meanwhile, the details of a method of generating a background image which is performed by the image processing unit 140 will be described later.

Next, in S402, the image processing unit 140 generates new image data (fourth image data) by performing a process of synthesizing or superimposing predetermined image data on the background image generated by the image processing unit 140 in S401. The predetermined image data to be synthesized or superimposed on the background image may be, for example, the address event data (second image data) itself. Further, it may be abstracted image data (fifth image data) such as an icon generated by converting, synthesizing, or the like the address event data. Meanwhile, the predetermined image data to be synthesized or superimposed on the background image may be determined by setting in advance which image data is to be used, and the control unit 130 may determine the data on the basis of the setting. Further, the data may be automatically selected and determined the control unit 130, or it may be determined by the user's instruction. Meanwhile, the details of a method of generating the image data to be synthesized or superimposed on the background image will be described later.

Next, in S403, the control unit 130 outputs the generated new image data (fourth image data) to the display device 190 through the communication unit 170. The output new image data is displayed on the display unit 194 of the display device 190 by the control unit 130. In this case, the control unit 130 also functions as a display control unit that causes the display unit 194 of the display device 190 to display the predetermined image data.

By performing the above processing, it is possible to display, on the display unit 194, new image data obtained by synthesizing or superimposing the predetermined image data on the background image created on the basis of the frame image and address event data acquired by the image pickup element 121 and the image pickup element 122 of the image capturing apparatus 100.

In addition, the control unit 130 causes the display unit 194 of the display device 190 to display the background image (third image data) generated in S401. In this case, the control unit 130 outputs the background image to the display device 190 through the communication unit 170 and causes the display unit 194 to display the background image. In addition, image data obtained by processing the address event data to form a frame image (event frame image) may be displayed on the display unit 194 of the display device 190. In this case, the control unit 130 outputs the frame image to the display device 190 through the communication unit 170 and causes the display unit 194 to display the frame image.

Alternatively, the abstracted image data (fifth image data) described above may be displayed on the display unit 194 on the display device 190. In this case, the control unit 130 outputs the abstracted image data to the display device 190 through the communication unit 170 and causes the display unit 194 to display the abstracted image data. At this time, the abstracted image data to be output to the display device 190 is preferably image data with a smaller number of pixels than the background image (third image data). The timing of the image data to be output by the image capturing apparatus 100 corresponds to the period in which the address event data is framed, which makes it possible to output the data in a period shorter than the capturing period of the frame image of the image pickup element 121.

In addition, the image capturing apparatus 100 may output the address event data (second image data) and the background image (third image data) to the display device 190. In this case, the control unit 130 may output the address event data and the background image to the display device 190 through the communication unit 170 and cause the display unit 194 to display the address event data superimposed or combined with the background image.

In addition, the background image (third image data) and the abstracted image data (fifth image data) described above may be output to the display device 190. In this case, the control unit 130 may output the background image and the abstracted image data to the display device 190 through the communication unit 170 and cause the display unit 194 to display the abstracted image data superimposed or combined with the background image.

Meanwhile, the process of displaying the image data on the display unit 194 may be performed by the control unit 192 of the display device 190 instead of the control unit 130. In that case, for example, after any of the image data output to the display device 190 by the control unit 130 is stored in the storage unit 193, the control unit 192 may read out the image data to be displayed on the display unit 194 from the storage unit 193 and cause the display unit 194 to display the image data. In addition, the image data output by the control unit 130 may be displayed on the display unit 194 by the control unit 192 without being stored in the storage unit 193.

In addition, image data (sixth image data) may be generated by performing a process of synthesizing or superimposing the address event data (second image data) on the background image (third image data) generated in step S401 in the display device 190 instead of the image capturing apparatus 100. In this case, for example, the image capturing apparatus 100 transmits the background image generated in S401 to the display device 190 at a predetermined timing. The display device 190 stores the received background image in the storage unit 193. Thereafter, the image capturing apparatus 100 sequentially outputs the generated address event data to the display device 190. The display device 190 then performs a process of synthesizing or superimposing the received address event data on the background image stored in the storage unit 193, and displays the processed image data (sixth image data) on the display unit 194. Alternatively, the background image and the address event may be stored in the storage unit 193 as a plurality of layer data and displayed on the display unit 194 so as to be superimposed.

(Process of Generating Background Image)

As described above, the image processing unit 140 can generate a synthesized image by processing the frame image on the basis of the detection result of the address event. The image processing unit 140 detects the position of generation of the moving object image from the region of occurrence of the address event in a certain reference frame image. The background image is generated by interpolating the region of occurrence of the moving object image from another frame image in which no address event occurs.

Figure 5:
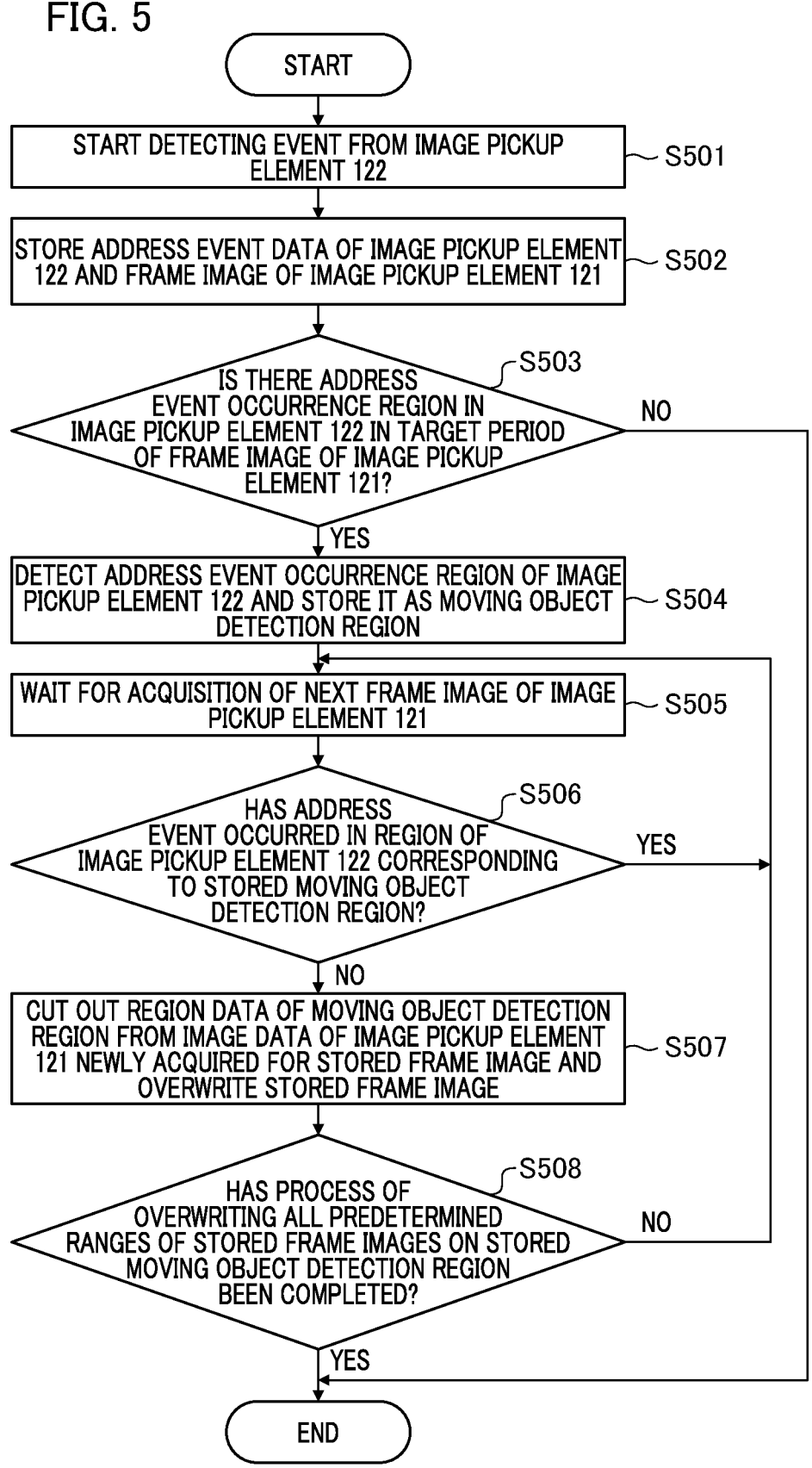
FIG. 5 is a flowchart illustrating an example a process of generating a background image according to Example 1.

A method of generating a synthesized image is not particularly limited, and will be described below an example with reference to FIG. 5. FIG. 5 is a flowchart illustrating an example of a process of generating a background image.

Meanwhile, each operation (process) shown in the flowchart of FIG. 5 is controlled by the CPU 210 executing a computer program. In addition, the following image synthesis processing can be performed by the synthesis unit 141 included in the image processing unit 140. Here, before the start of S501, the image pickup element 121 and the image pickup element 122 are in a state where the image capturing operation has started.

First, in S501, if an instruction for generation of a background image is received through an input of the operation unit 195 or the like, the control unit 130 transmits a control signal to the image processing unit 140 to start a process of detecting an address event. The image processing unit 140 starts to detect an address event from the address event data acquired by the image pickup element 122 on the basis of the control signal from the control unit 130.

Next, in S502, the control unit 130 acquires a frame image from the image pickup element 121 and stores the frame image in the storage unit 150. The frame image acquired at this time is image data used for generating the background image.

Next, in S503, the control unit 130 determines whether there is a region of occurrence of an address event in the address event data of the image pickup element 122 during the exposure period of the image data stored in S502. As a result of the determination, if it is detected that no address event has occurred during the period, that is, there is no moving object in the frame image captured by the image pickup element 121, the frame image stored in the storage unit 150 in S502 is determined as the background image, and the process ends. On the other hand, if the occurrence of the address event, that is, the region of occurrence of the moving object is detected from information on the coordinates of the detected address event, it is determined that there is the region of occurrence of the address event, the process proceeds to S504.

Next, in S504, the control unit 130 stores the region of occurrence of the address event in the storage unit 150 as a moving object detection region. Meanwhile, the moving object detection region may be the coordinates of occurrence of the address event themselves, or may be stored as a region (image region) including the region of occurrence of the address event. For example, the amount of data to be stored can be reduced by dividing a frame image into lattice-shaped block regions and storing the region of occurrence of the address event.

Next, in S505, the control unit 130 temporarily stops (waits for) the processing until the next frame image is acquired from the image pickup element 121. If the image pickup element 121 acquires the frame image and the control unit 130 acquires it, the process proceeds to step S506.

Next, in S506, the control unit 130 determines whether an address event has occurred in the moving object detection region stored in the storage unit 150 in the newly acquired frame image. As a result of the determination, if no address event has occurred, the process proceeds to S507. On the other hand, if an address event has occurred, the process returns to S505 and the same process is performed.

Next, in S507, the image processing unit 140 overwrites the region of the frame image corresponding to the moving object detection region stored in the storage unit 150 on the background image. Specifically, for the frame image stored in the storage unit 150 in S504, region data of the moving object detection region is cut out from the newly acquired frame image of the image pickup element 121 in S505. The cut-out region data is then overwritten on the frame image stored in the storage unit 150 in S504.

Next, in S508, the control unit 130 determines whether the overwriting process with the frame images in which no address event has occurred has been completed for all the moving object detection regions stored in the storage unit 150. As a result of the determination, if the overwriting process of the frame images corresponding to all the stored moving object detection regions has not been completed, the process returns to S505, and the processes from S505 to S508 are repeated. On the other hand, if the overwriting process of the frame images corresponding to all the stored moving object detection regions has been completed, the frame images at this time are stored in the storage unit 150 as the background image, and the process of generating the background image is finished.

By performing the above processing, the background image from which the moving object (moving object image of the subject) has been removed can be stored in the storage unit 150 with a predetermined time as a reference. Meanwhile, the background image may be generated on the display device 190 side and displayed on the display unit 194 of the display device 190. That is, the control unit 130 may output the acquired frame image and address event data to the display device 190, the control unit 192 of the display device 190 may perform the above processing to generate the background image, and the control unit 192 may cause the display unit 194 to display the background image.

Figure 6:
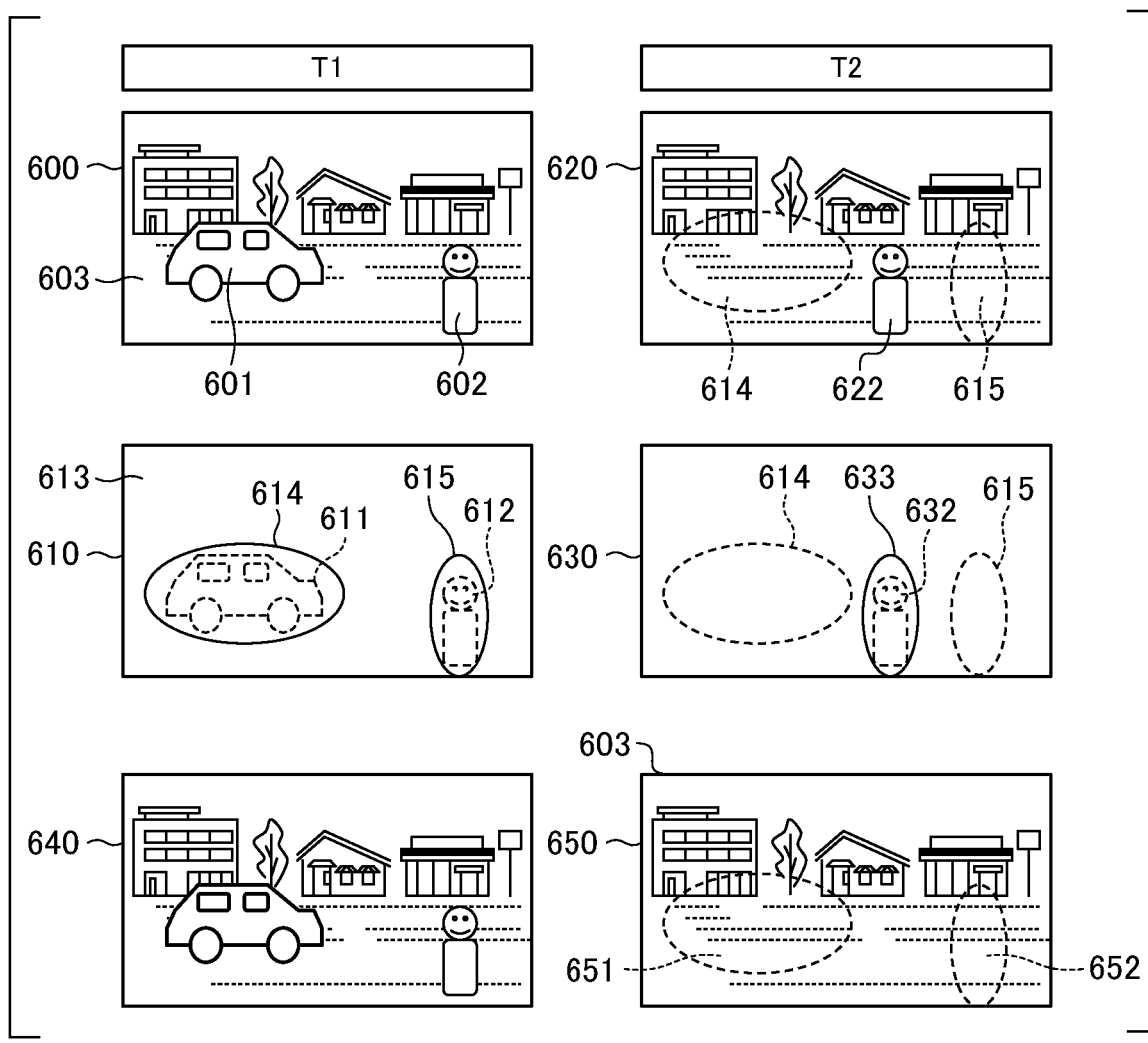
FIG. 6 is a schematic diagram illustrating a process of generating a background image according to Example 1.

FIG. 6 is a schematic diagram illustrating a method of generating (a process of generating) the background image shown in FIG. 5. A captured image 600 and a captured image 620 are frame images which are captured by the image pickup element 121 at time T1 and time T2, respectively. A captured image 610 and a captured image 630 are event frame images obtained by plotting the address event data acquired by the image pickup element 122 at time T1 and time T2 on a two-dimensional plane for convenience. A captured image 640 is a frame image acquired by the image pickup element 121 at time T1, and is an image used for generate a background image in the processing shown in FIG. 5. A background image 650 is a background image generated by the image processing unit 140 performing the processing shown in FIG. 5 at time T2. The background image is generated as described above and then stored in the storage unit 150.

At time T1, images of moving subjects 601 and 602 and a stationary background region 603 are captured in the captured image 600. In addition, address event data group 611 and address event data group 612 corresponding to the subject 601 and the subject 602, respectively, are detected as the address event data. The image processing unit 140 sets a region 614 and a region 615 including the region of occurrence of the address event, and holds these regions in the storage unit 150. Meanwhile, in FIG. 6, for convenience, the region 614 and the region 615 including the region of occurrence of the address event are shown as circular regions such as ellipses. However, these regions are not limited to this and may be rectangular regions such as squares. Further, the frame image may be divided into lattice-shaped block regions as described above, and one or a plurality of block regions where the address event has occurred may be set as the region 614 and the region 615 and stored in the storage unit 150.

At the subsequent time T2, an image of a subject 622 moving from the region 615 is captured including the background region in the captured image 620. In addition, at this time, the moving subject 601 is not included in the image region of the captured image 620 (moved outside the image region). In addition, an address event data group 632 corresponding to the subject 622 at this time is detected as address event data. The image processing unit 140 sets a region 633 including the region of occurrence of the address event and holds the region in the storage unit 150. Further, the image processing unit 140 determines whether a corresponding address event has occurred during the exposure period of the frame image in the region 614 and the region 615 which are the regions of occurrence of the address event held in the storage unit 150.

If the control unit 130 determines that no address event has occurred in the region 614 and the region 615 during the period, the image processing unit 140 sets the region 614 and the region 615 on the captured image 620 as regions of non-occurrence of the address event. The image processing unit 140 then overwrites the image region data corresponding to the region 614 and the region 615 which are regions of non-occurrence at this point in time with respect to the captured image 640 held in the storage unit 150. This makes it possible to obtain the background image 650 as an image from which the moving subject is removed.

The background image 650 is a synthesized image of the background region 603 consisting of the captured image 600 at time T1 and image regions 651 and 652 acquired from the captured image 620 at time T2. As described above, by processing the frame image using the detection result of the address event, it is possible to acquire a background image from which the moving subject is removed. Meanwhile, although the generation of the background image at points in time T1 and T2 has been described as an example, the same processing as described above is also performed after time T2.

Here, although the process of generating a background image in a case where there is a moving object image (moving subject) within the imaging angle of view has been described, the method of acquiring a background image is not limited to this method. For example, a frame image may be acquired in advance at the time when there is no moving object and stored in the storage unit 150, and a background image may be generated by performing the processing as described above using the frame image at the time of generating the background image.

Figure 7:
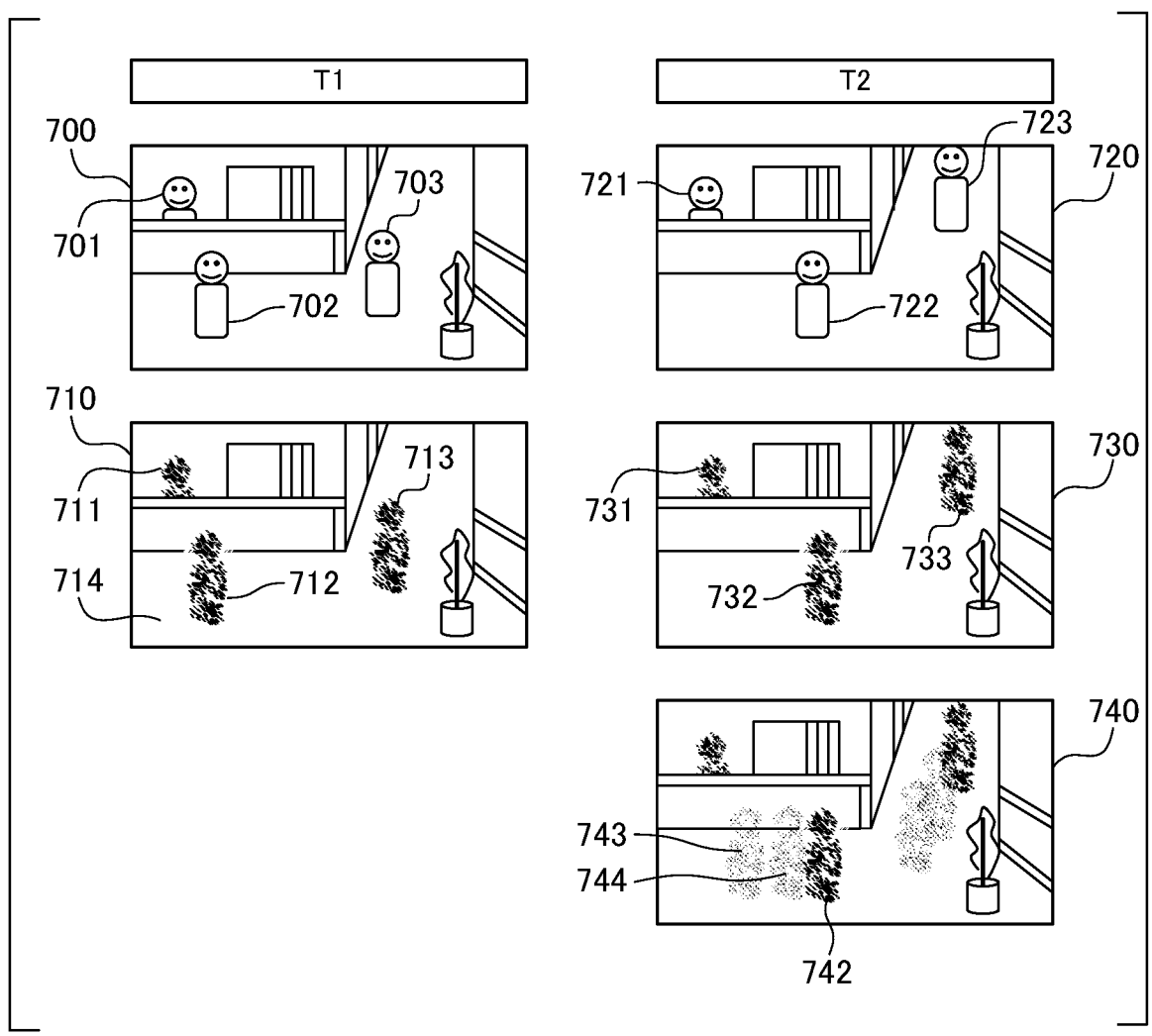
FIG. 7 is a schematic diagram illustrating an example of image data obtained by synthesizing or superimposing address data on a background image according to Example 1.

FIG. 7 is a schematic diagram illustrating an example of new image data (fourth image data) which is a synthesized image on which synthesis processing is performed by the image processing unit 140 described in S402 of FIG. 4. A captured image 700 is a frame image captured by the image pickup element 121 at time T1. A captured image 720 is a frame image captured by the image pickup element 121 at time T2. A synthesized image 710, a synthesized image 730, and a synthesized image 740 are synthesized images (fourth image data) obtained by performing a process of superimposing the address event data of the image pickup element 122 corresponding to time T1 and time T2 on the background image generated in S402 and stored in the storage unit 150.

Images of persons of a subject 701, a subject 702, and a subject 703 are captured in the captured image 700. The synthesized image 710 is an image in which address event data groups 711, 712, and 713 corresponding to the subjects 701, 702, and 703 of the captured image 700 are synthesized with a background image 714.

Images of persons of a subject 721, a subject 722, and a subject 723 are captured in the captured image 720. At this time, the subject 721 has not moved since time T1. The subject 722 and the subject 723 have moved from time T1 to time T2. The synthesized image 730 is an image in which address event data groups 731, 732, and 733 corresponding to the subject 721 and the subject 723 of the synthesized image 730 are synthesized.

The detected address event consists of coordinate information, an event detection value E (−1, +1), and time information. Here, the address event does not have a sign, and only the coordinate information is used, converted into pixel data having a specific color, and superimposed on the background image. For example, if the synthesized image 710 is used as an example, the address event data group (subject information) 711, 712, and 713 are converted into pixel data of different colors and superimposed on the background image so that the subjects can be likely to be distinguished from each other. This makes it possible to further improve the visibility. Displaying the subjects in different colors in this way makes it easy to identify the subjects, and makes it possible for the user to easily identify the movement of a specific subject even if there are a plurality of subjects. Meanwhile, the colors may be unified without separating the colors for each subject.

The synthesized image 740 shows a state in which address event data groups generated at different times are superimposed on the same background image. An address event data group 742 is address events that have occurred immediately before time T2. An address event data group 743 is the address event data group 712 generated immediately before time T1. An address event data group 744 is an address event data group generated between times T1 and T2.

In the synthesized image 740, address event data groups corresponding to the same subject are superimposed on the background image as pixel values of the same color system, and are superimposed on the background image so that the color becomes darker as the time of the address event data group becomes newer as shown in FIG. 7. By superimposing the address event data on the background image in this way, it becomes easier to intuitively recognize the movement direction and movement speed of the subject. Meanwhile, an address event data group may be superimposed on the background image so that the color becomes lighter as the time of the address event data group becomes newer.

Personal privacy may be an issue if image capturing is performed for the purpose of monitoring a specific region. According to the above processing shown in FIG. 7, since the address event data is superimposed on the generated background image in the image region where the subject is located, it is possible to protect the privacy of the subject and to monitor the movement of the subject.

Meanwhile, while the above-described process of generating new image data (fourth image data) by synthesizing the address event data with the background image is performed by the image processing unit 140 of the image capturing apparatus 100, this image data synthesis processing or the like may be performed on the display device 190 side.

For example, if FIG. 7 is used as an example, the image capturing apparatus 100 transmits the generated background image 714 to the display device 190. Thereafter, the generated address event data groups 711, 712, and 713 are transmitted to the display device. The display device 190 stores the received background image 714 in the storage unit 193. Thereafter, the received address event data groups 711, 712, and 713 are sequentially stored in the storage unit 193. Thereafter, the control unit 192 of the display device 190 performs a process of superimposing the address event data groups 711 to 713 on the background image 714 stored in the storage unit 193 and outputs the generated synthesized image 710 to the display unit 194. This makes it possible to display the synthesized image 710 on the display unit 194.

Further, similarly, the control unit 192 of the display device 190 reads out the address event data groups 742, 743, and 744 received at different times and stored in the storage unit 193 from the storage unit 193. It is possible to display the synthesized image 740 on the display unit 194 by superimposing it on the background image 714 similarly read out from the storage unit 193.

Here, for example, if the color tones of the background image and the subject image (for example, address event data group) in the synthesized image are close to each other, the subject image may be buried in the background image, making visual confirmation of the subject image difficult. Consequently, the display of the background image and the subject image in the synthesized image described above may be configured to be switchable between ON and OFF. As ON/OFF switching, for example, a synthesized image as shown in FIG. 7 may be displayed in an ON state, and the background image or the subject image may be displayed in an OFF state. The display ON/OFF switching operation is configured to be appropriately switchable by the user's instruction (for example, the operation of the operation unit 195). Further, in addition the ON/OFF switching operation, it may be possible to switch between three types of display, that is, display of a synthesized image, display of only a background image, and display of only a subject image (for example, an address event data group). In addition, these switching operations may be performed by the operation unit 195, or a switching button may be added to the user interface (UI) and operated to switch the above image data. In this way, it is possible to further improve the visibility of the background image and the subject.

As described above, by causing the display unit 194 to display the synthesized image as described above, it becomes easy to confirm the state of the subject even if the subject is moving at a low or high speed. In addition, displaying the subject as an address event facilitates confirmation of the surrounding environment while protecting privacy. Further, by synthesizing the background image as a still image with sufficient resolution and color gradation, it is also possible to confirm more detailed information on the surrounding environment.

Figure 8:
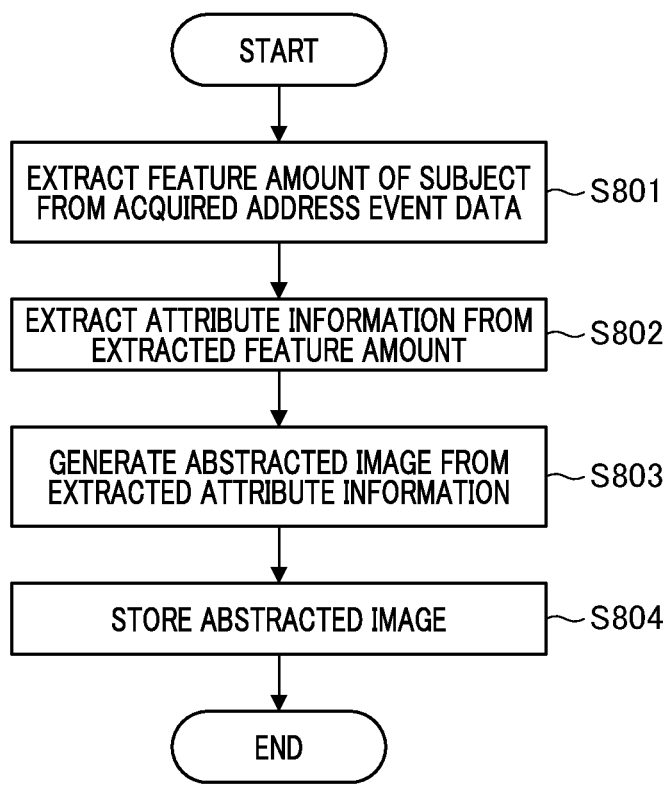
FIG. 8 is a flowchart illustrating a process of generating an abstracted image according to Example 1.

Next, a generation method in an example of image data to be synthesized or superimposed on the background image in S402 of FIG. 4 will be described below with reference to FIGS. 8 and 9. FIG. 8 is a flowchart illustrating a process of generating image data abstracted from detected address event data (abstracted image data). Meanwhile, each operation (process) shown in the flowchart of FIG. 8 is controlled by the CPU 210 executing a computer program. In addition, each step is marked with S at the head to omit the notation of step.

First, in S801, the analysis unit 142 of the image processing unit 140 extracts the feature amount of the subject (such as, for example, information on the shape of the subject) from the acquired address event data. When the feature amount of the subject is extracted, for example, the control unit 130 transmits the address event data for each unit time to the image processing unit 140. The image processing unit 140 converts the transmitted address event data per unit time into a frame image to generate an event frame image.

The event frame image may be generated by sequentially processing the address event data received by the image processing unit 140 in real time. Alternatively, the event frame image may be generated from the address event data which is once stored in the storage unit 150 and read out from the storage unit 150 at different timings. Further, the generated event frame image may be configured to be stored in the storage unit 150. The event frame image is a frame image composed of three values (+1/0/−1) as pixel values like the image 331 and the image 334 shown in FIG. 3. Meanwhile, a pixel region in which pixel values having close coordinates are aggregated becomes image data having signs (−1/+1) in the contour portion of the moving subject. A contour image obtained by connecting adjacent pixel values becomes an image indicating the shape of the subject. That is, the shape of the subject can be extracted as a feature amount. Further, as in the image 332 of FIG. 3, by lengthening the period of frame imaging, it is possible to detect the contour of the subject conspicuously.

Next, in S802, attribute information is extracted from the extracted feature amount, and the extracted attribute information is stored in the storage unit 150 in association with the coordinate information of the subject. The attribute information is information that makes it possible to identify the category of the subject (such as a person or a vehicle). Next, the movement direction and movement speed are extracted by comparing a plurality of event frame images generated from address event data of different periods. By comparing subjects having the same shape, it is possible to detect the amount of movement per unit time and time information. In addition, the speed can be detected from the detected amount of movement and time information. After the amount of movement and the time information are detected, both are stored in the storage unit 150 as attribute information of the subject.

In addition, for example, when event frame images generated from address event data groups of a plurality of different periods with close occurrence times are compared with each other, it is possible to determine that they are the same subject even if the pixel values of the same coordinates are included. In addition, for example, even if subject images having similar shapes that exist in different event frames and have close coordinates are moving the same direction at the same speed, it can be determined that they are the same subject image. Further, the analysis unit 142 classifies the category of the target subject on the basis of the extracted contour information (shape) of the subject. This may be performed, for example, by machine learning or deep learning processing. Alternatively, the shape may be configured to be identified by pattern matching. This makes it possible to classify subjects such as, for example, persons and vehicles and to detect the movement speed or the like of the subject.

Meanwhile, as for the method of extracting a feature amount from the address event data, the feature amount is extracted from the event frame image in the above, but processing may be performed without generating the event frame image. The analysis unit 142 of the image processing unit 140 can be configured to calculate a motion vector or the like directly from the address event data acquired sequentially. For example, the amount of movement may be determined and the subject may be classified by acquiring address event data as data that changes over time and performing machine learning.

Next, in S803, the abstraction unit 143 of the image processing unit 140 generates abstracted image data (fifth image data) from the attribute information extracted by the analysis unit 142. The abstracted image data is, for example, icon information such as an image indicating an arrow or a direction indicator indicating the movement direction of the subject, or image data obtained by connecting the trajectory of movement of the subject. In addition, the abstracted image data may be, for example, icon image data represented by a simple image such as an icon indicting a subject. The icon image data may be, for example, stored in advance in the storage unit 150. For example, a table in which the attribute information and the icon image data are associated with each other may be stored in the storage unit 150, and the icon image data may be selected from information on the classification of the subject determined by the analysis unit 142. Meanwhile, the abstraction unit 143 may generate abstracted image data from the feature amount of the subject.

Next, in S804, the determined abstracted image data generated by the abstraction unit 143 is stored in the storage unit 150. Meanwhile, the number of pieces of abstracted image data to be generated is not limited to one, and a plurality of patterns as described above may be generated and stored in the storage unit 150.

In addition, the generated abstracted image data may be configured to be sequentially output to the display device 190. In addition, the abstracted image data may be output only once, and then the amount of movement (coordinate information) of the subject detected from the address event data may be output to the display device 190. Here, the display device 190 may be configured to causes the display unit 194 to display the stored abstracted image data on the stored background image while the position of the data is changed on the basis of the coordinate information received sequentially. In this way, the amount of data to be output can be reduced by reducing the number of times the image data is output by the image capturing apparatus 100.

Figure 9:
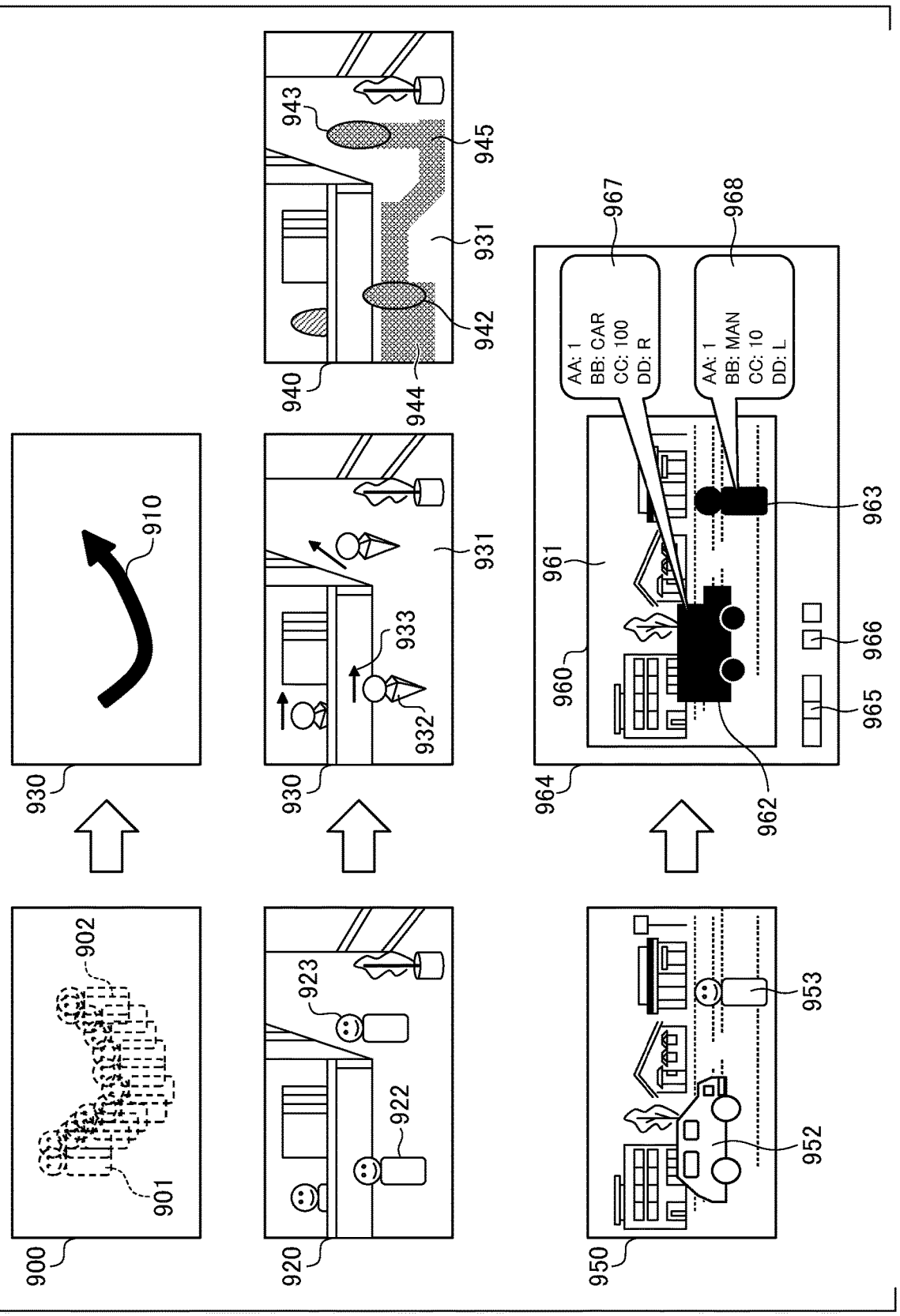
FIG. 9 is a schematic diagram illustrating an example of image data obtained by synthesizing or superimposing an abstracted image on a background image according to Example 1.

FIG. 9 is a diagram illustrating details of generation of abstracted image data and new image data (fourth image data) which is a synthesized image obtained by synthesizing the abstracted image data with a background image. Image data 900 represents an event frame image in which a plurality of event frame images are superimposed and displayed. An address event data group 901 and an address event data group 902 represent address events that have occurred at different times.

Image data 930 is abstracted image data indicating a movement trajectory 910 of the subject generated by the abstraction unit 143. The movement trajectory 910 of the subject shown in the image data 930 is indicated by an arrow as an example. For the generation of the movement trajectory, for example, image data of the movement trajectory can be generated by connecting the central points of the subject in which the address event data group 901 and the address event data group 902 are determined to be the same subject by the analysis unit 142 with a curve along the passage of time. The image data of the movement trajectory may change in thickness in accordance with the size of the subject. In addition, when the abstracted image data indicating this movement trajectory is generated, the abstraction unit 143 may generate a frame image as shown in FIG. 9, or may generate only the image data of the movement trajectory. Meanwhile, when the abstracted image data indicating the movement trajectory is generated, it may not be a complete central point of the subject, and points near the substantially center may be connected by a curve along the passage of time. Further, abstracted image data indicating the movement trajectory may be generated with a polyline or the like instead of a curve.

Image data 920 represents an event frame image in which a plurality of event frame images are superimposed and displayed. The image data 930 and image data 940 are image data obtained by synthesizing the abstracted image data generated by the abstraction unit 143 with a generated background image 931. For example, a subject 922 is converted into an abstracted image 932 and an abstracted image 942 and synthesized.

An abstracted image 933 represents the movement direction and movement speed of the abstracted image 932. An abstracted image 944 and an abstracted image 945 represent the movement trajectories of the abstracted image 942 and an abstracted image 943. In addition, if there are a plurality of subjects, the color or pattern may be changed for each subject. Further, an arrow indicating the movement direction may be added. The length of the movement trajectory may be changed in accordance with the period set by the user. For example, it may be configured to allow the user to select how many minutes in the past from the current display image to display the event occurrence region. Here, the generated address event data and the generated event frame image may be stored in the storage unit of the image capturing apparatus 100, or may be stored in the storage unit 193 of the display device 190. For example, the user can operate the operation unit 195 to change the setting value.

Image data 950 is a frame image acquired by the image pickup element 121. Images of a subject 952 and a subject 953 are captured as moving subjects. Image data 964 indicates image data displayed on the display unit 194 of the display device 190. In this case, as shown in FIG. 9, the subject 952 and the subject 953 are replaced with a silhouette image 962 and a silhouette image 963 when they are displayed on the display unit 194. Display information 965 and display information 966 are information display related to the image data 964 such as, for example, the time of capturing of the image data 950, the time of generation of the image data 964, and information on the position of a place where the image data 950 is acquired. Display information 967 and display information 968 are attribute information of the subject analyzed by the analysis unit 142, and are information such as, for example, item numbers for identifying a plurality of subjects, subject image classification (a person or a vehicle), coordinate information, movement speed, or movement direction. Meanwhile, the image capturing apparatus 100 may transmit image data 960 obtained by synthesizing the silhouette image 962 and the silhouette image 963 and the attribute information of the subject to the display device 190, and the control unit 192 may synthesize the image data 964 which is a display image.

In addition, the image capturing apparatus 100 may separate a background image 961, the silhouette image 962, the silhouette image 963, and the attribute information of the subject, and transmit them to the display device 190. The display device 190 may store the received image in the storage unit 193 and synthesize the received image data stored by the control unit 192 to generate the image data 960. Thereafter, the synthesized image data 960 is displayed on the display unit 194.

In addition, the image capturing apparatus 100 may be configured to transmit the background image 961 and to transmit the generated address event data. The display device 190 stores the received background image 961 and the address event data in the storage unit 193. The control unit 192 of the display device 190 may further includes a unit configured to analyze the address event data, generate a silhouette image based on the analysis result, and synthesize it with the background image 961. In this case, the display device 190 calculates the attribute information of the subject from the received address event data. The display device 190 superimposes the generated attribute information on the synthesized image data 960 and causes the display unit 194 to display the data.

Here, the synthesis unit 141, the analysis unit 142, and the abstraction unit 143 may be provided in the display device 190. Further, the control unit 192 may be configured to perform the same processing as the image processing unit 140. In addition, although the image capturing apparatus 100 and the display device 190 have been described as separate apparatuses in Example 1, the image capturing apparatus 100 may be configured to include the display device 190.

As described above, with the configuration of the image capturing system constituting the image capturing apparatus 100 and the display device 190 in Example 1, it is possible to improve the visibility of the image data displayed on the display device 190.

Second Embodiment

An image capturing system including the image capturing apparatus 100 and the display device 190 in Example 2 will be described below. For example, if image capturing is performed in a dark environment, it is necessary to increase a gain during image capturing, and thus visibility may deteriorate due to the occurrence of noise. Therefore, it is preferable to reduce the amount of noise in the image data. In the image capturing system of Example 2, it is possible to reduce the amount of noise in the image data by performing a process of reducing the amount of noise in the image data to be output. The processing of Example 2 will be described below with reference to FIG. 10. The configurations of the image capturing apparatus 100 and the display device 190 in Example 2 are the same configurations as in FIG. 1 described in Example 1. Therefore, repeated description in each unit will be omitted. In addition, matters which are not mentioned in Example 2 conform to Example 1.

Figure 10:
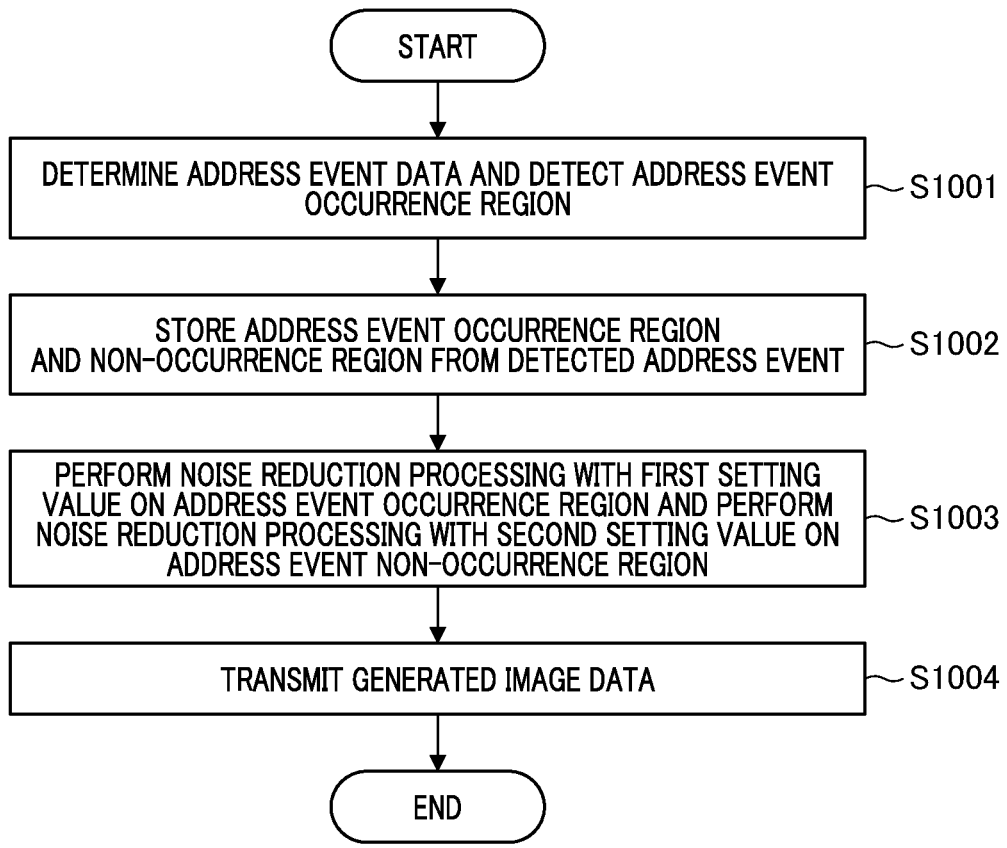
FIG. 10 is a flowchart illustrating processing according to Example 2.

FIG. 10 is a flowchart illustrating an example of a flow of noise reduction processing for a frame image which is output by the image capturing apparatus 100 using the address event data of the image pickup element 122. Meanwhile, each operation (process) shown in the flowchart of FIG. 10 is controlled by the CPU 210 executing a computer program. In addition, each step is marked with S at the head to omit the notation of step.

First, in S1001, the image processing unit 140 detects a region of occurrence of an address event on the basis of the address event data captured by the image pickup element 122.

Next, in S1002, the control unit 130 stores the detected region of occurrence of the address event (first image region) and a region of non-occurrence (second image region) in the storage unit 150. The region of the address event to be stored may be the coordinates of occurrence of the address event themselves, or may be stored as a region including the region of occurrence of the address event. For example, the amount of data in the region to be stored can be reduced by dividing the frame image into lattice-shaped block regions and storing the region of occurrence of the address event.

Next, in S1003, the control unit 130 performs a first filter setting on the region of occurrence of the address event stored in the storage unit 150, and the image processing unit 140 performs noise reduction processing. Additionally, the control unit 130 performs a second filter setting on the region of non-occurrence of the address event, and the image processing unit 140 performs noise reduction processing.

Meanwhile, the noise reduction processing may be configured to be performed by the control unit 130.

Next, in S1004, the image processing unit 140 generates image data to be output to the display device on the basis of the image data on which the noise reduction processing has been performed in S1003. The image data generated by the image processing unit 140 is output to the display device 190 through the communication unit 170 and displayed on the display unit 194. Meanwhile, the data to be generated is not limited to the frame image, and may be image data obtained by converting still image data or moving image data into a predetermined format, or these may likewise be output to the display device 190 and displayed on the display unit 194.

Here, the second filter setting in Example 2 may be set to a setting value having a stronger (higher) noise reduction effect than the first filter setting. That is, a second setting value in the second filter setting is set so that the noise reduction effect is higher than the first filter setting value in the first filter setting. Here, for example, as the noise reduction processing in a moving image, there is recursive filter processing in which filter processing is performed on each pixel of a frame image in the direction of the time axis. If the recursive filter processing is performed, a change in the subject between frame images causes the occurrence of color mixture of pixel values. If no address event occurs, that is, there is no motion in the subject, color mixture does not occur even when the number of taps of the recursive filter between frames is increased, and an image with a higher noise reduction processing effect can be obtained. Since the region where the address event occurs is a region where the subject is changing, it is preferable to weaken the setting of the recursive filter. By reducing the number of taps of the recursive filter, the number of frames on which filter processing is performed is reduced, and thus it is possible to suppress the occurrence of color mixture even for a fast-moving subject.

It is preferable to set the noise reduction processing especially in a low-luminance environment. In addition, if a moving image is generated, it is preferable to perform the recursive filter processing between frames as the noise reduction processing. Further, since random noise components increase in a low-luminance environment, it is possible to reduce the amount of noise in the frame image by setting the noise reduction filter processing to be strong for the region of non-occurrence of the address event. Further, by reducing random noise components, it is also possible to reduce the amount of data of image data to be delivered.

As described above, in the image capturing system including the image capturing apparatus 100 and the display device 190 in Example 2, it is possible to reduce the amount of noise in the image data.

Third Embodiment

An image capturing system including the image capturing apparatus 100 and the display device 190 in Example 3 will be described below. For example, the bandwidth of communication data may be an issue if delivery through the network 180 is performed. Therefore, it is preferable to reduce the amount of data to be output from the image capturing apparatus 100 insofar as possible. In the image capturing system of Example 3, the amount of data to be output can be reduced by performing a process of reducing the amount of data of the image data to be output by the image capturing apparatus 100. The processing of Example 3 will be described below with reference to FIG. 11. The configurations of the image capturing apparatus 100 and the display device 190 in Example 3 are the same configurations as in FIG. 1 described in Example 1. Therefore, repeated description in each unit will be omitted. In addition, matters which are not mentioned in Example 3 conform to Example 1.

FIG. 11 is a flowchart illustrating an example of a flow of compression processing for a frame image to be output by the image capturing apparatus 100 using the address event data of the image pickup element 122. Meanwhile, each operation (process) shown in the flowchart of FIG. 11 is controlled by the CPU 210 executing a computer program. In addition, each step is marked with S at the head to omit the notation of step.

First, in S1101, the image processing unit 140 detects a region of occurrence of an address event on the basis of the address event data captured by the image pickup element 122. The image processing unit 140 notifies the control unit 130 of the detected region information.

Next, in S1102, the control unit 130 stores the acquired region of occurrence of the address event (first image region) and a region of non-occurrence (second image region) in the storage unit 150. The region of the address event to be stored may be the coordinates of occurrence of the address event themselves, or may be stored as a region including the region of occurrence of the address event. For example, the amount of data in the region to be stored can be reduced by dividing the frame image into lattice-shaped block regions and storing the region of occurrence of the address event.

Next, in S1103, the control unit 130 performs the compression processing for delivery (for output) after setting the first setting value for the region of occurrence of the address event stored in the storage unit 150 and setting the second setting value for the region of non-occurrence. Meanwhile, the compression processing may be configured to be performed by the image processing unit 140.

Next, in S1104, the image processing unit 140 generates image data to be output to the display device on the basis of the image data on which the compression processing has been performed in S1103. The image data generated by the image processing unit 140 is output to the display device 190 through the communication unit 170 and displayed on the display unit 194. Meanwhile, the data to be generated is not limited to the frame image, and may be image data obtained by converting still image data or moving image data into a predetermined format, or these may likewise be output to the display device 190 and displayed on the display unit 194.

Here, the second setting value (setting value for background) in Example 3 may be set to a setting value having a higher compression rate than the first setting value (setting value for a moving object image). For example, if the main subject is a moving person image as in a sporting event, it is preferable that the moving main subject itself has a high resolution. In such case, by setting a low compression rate for the region of occurrence of the address event, it is possible to keep the resolution high. This improves the visibility of the facial expression or the like of the person image. In addition, since the background image is a region that hardly changes over time, it is possible to increase the compression rate. This makes it possible to reduce the amount of data of image data to be delivered.

On the other hand, the first setting value may be set to have a higher compression rate than the second setting value. If image data is delivered by combining the background image and the address event data shown in Example 1, the frame image to be output from the image capturing apparatus is transmitted as data for one background image in a predetermined period. As a result, since the frame rate of the frame image is lowered, the output data can be greatly reduced, which makes it less likely that lowering the compression rate of the frame image will put pressure on the communication band. In addition, a higher resolution of the background image gives rise to better visibility, which leads to a desirable result.

If the address event data is transmitted as a synthesized frame image, or if the address event data is represented by, for example, an abstracted image such as a silhouette image, the resolution of the moving subject itself which is the region of occurrence of the address event is not required. Consequently, by increasing the compression rate for the region of occurrence of the address event, it is possible to reduce the amount of image data to be delivered. On the other hand, if the subject does not change even in a case where the address event data is transmitted without being synthesized, the address event does not occur, and thus the amount of data becomes sufficiently small relative to the frame image. Therefore, it is less likely to put pressure on the communication band.

As described above, in the image capturing system including the image capturing apparatus 100 and the display device 190 in Example 3, it is possible to reduce the amount of data to be output.

Hereinbefore, although the preferable embodiments of the present invention have been described, the present invention is not limited to these embodiments, and various modifications and changes are possible without departing from the scope of the gist.

In addition, a computer program for realizing some or all of control functions of the embodiments described above may be supplied to the image capturing apparatus 100, the display device 190, or the like through a network or various storages. A computer (or a CPU, an MPU, or the like) in the image capturing apparatus 100, the display device 190, or the like may read out and execute the program. In that case, the program and a storage having the program stored therein constitute the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-067199, Apr. 14, 2022, which is hereby incorporated by reference wherein in its entirety.

What is claimed is:

1. An image processing apparatus comprising at least one processor or circuit configured to function as:
a first image capturing unit configured to acquire first image data which is image data of a frame format;
a second image capturing unit configured to acquire second image data which is data based on event data of a change in luminance of a subject for each pixel; and
a processing unit configured to generate third image data by performing a process of removing a moving object image included in the first image data from the first image data on the basis of the second image data,
wherein the processing unit generates fourth image data by performing a process of superimposing or synthesizing the second image data on the third image data.

2. The image processing apparatus according to claim 1, wherein the fourth image data includes one or a plurality of subjects, and image regions of the plurality of subjects are image data colored with different colors.

3. The image processing apparatus according to claim 1, wherein the processing unit extracts attribute information of the subject from the second image data and generates fifth image data which is image data based on the attribute information.

4. The image processing apparatus according to claim 3, wherein the processing unit generates fourth image data by performing a process of superimposing or synthesizing the fifth image data on the third image data.

5. The image processing apparatus according to claim 4, further comprising a display control unit configured to cause a display unit included in an information processing apparatus to display a predetermined image,
wherein the display control unit causes the display unit to display at least any of the second image data, the fourth image data, and the fifth image data.

6. The image processing apparatus according to claim 5, wherein the display control unit causes the display unit to display a combination of the third image data and the fifth image data.

7. The image processing apparatus according to claim 3, wherein the fifth image data is image data indicating an arrow or a direction indicator indicating a movement direction of the subject.

8. The image processing apparatus according to claim 3, wherein the fifth image data is image data indicating a trajectory along which the subject moves.

9. The image processing apparatus according to claim 3, wherein the attribute information is information including a category of the subject.

10. The image processing apparatus according to claim 3, wherein the attribute information is information including a movement method or movement speed of the subject.

11. The image processing apparatus according to 1, further comprising a display control unit configured to cause a display unit included in an information processing apparatus to display a predetermined image, wherein the display control unit causes the display unit to display at least any of the second image data, the third image data, and the fourth image data.

12. The image processing apparatus according to claim 11, wherein the display control unit causes the display unit to display a combination of the second image data and the third image data.

13. The image processing apparatus according to claim 1, wherein the second image capturing unit detects a change in luminance of the subject by counting the number of incident photons, and calculates the event data by comparing the number of photons at predetermined time intervals.

14. The image processing apparatus according to claim 1, wherein the process includes at least noise reduction processing or compression processing of image data.

15. The image processing apparatus according to claim 14, wherein the process is performed with a first setting value on a first image region including a pixel region in which the event data has occurred, and the process is performed with a second setting value on a second image region including a pixel region in which the event data has not occurred.

16. The image processing apparatus according to claim 15, wherein the first setting value has a higher noise reduction effect than the second setting value.

17. The image processing apparatus according to claim 15, wherein the second setting value has a higher compression rate than the first setting value.

18. A method of controlling an image processing apparatus, comprising:
acquiring first image data which is image data of a frame format;
acquiring second image data which is data based on event data of a change in luminance of a subject for each pixel; and
generating third image data by performing predetermined processing on the first image data on the basis of the second image data; and
generating fourth image data by performing a process of superimposing or synthesizing the second image data on the third image data.

19. A non-transitory computer readable storage having a program stored therein, the program causing a computer to:
acquire first image data which is image data of a frame format;
acquire second image data which is data based on event data of a change in luminance of a subject for each pixel; and
generate third image data by performing predetermined processing on the first image data on the basis of the second image data; and
generate fourth image data by performing a process of superimposing or synthesizing the second image data on the third image data.

* * * * *